May 14, 1929.  T. C. COLBIORNSEN  1,712,651
LIFTER FOR SALT GRAINERS
Filed Sept. 7, 1927  6 Sheets-Sheet 1
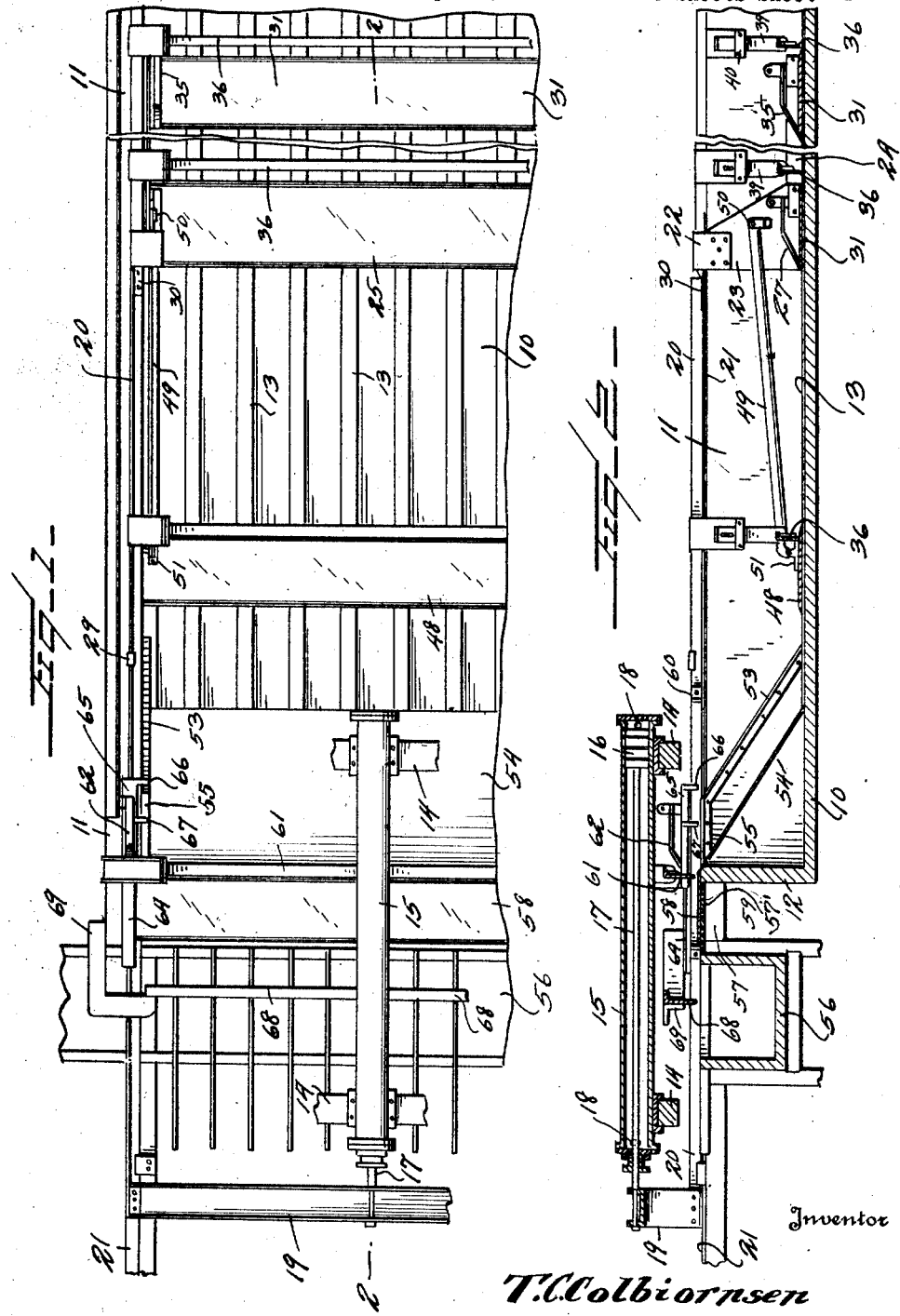

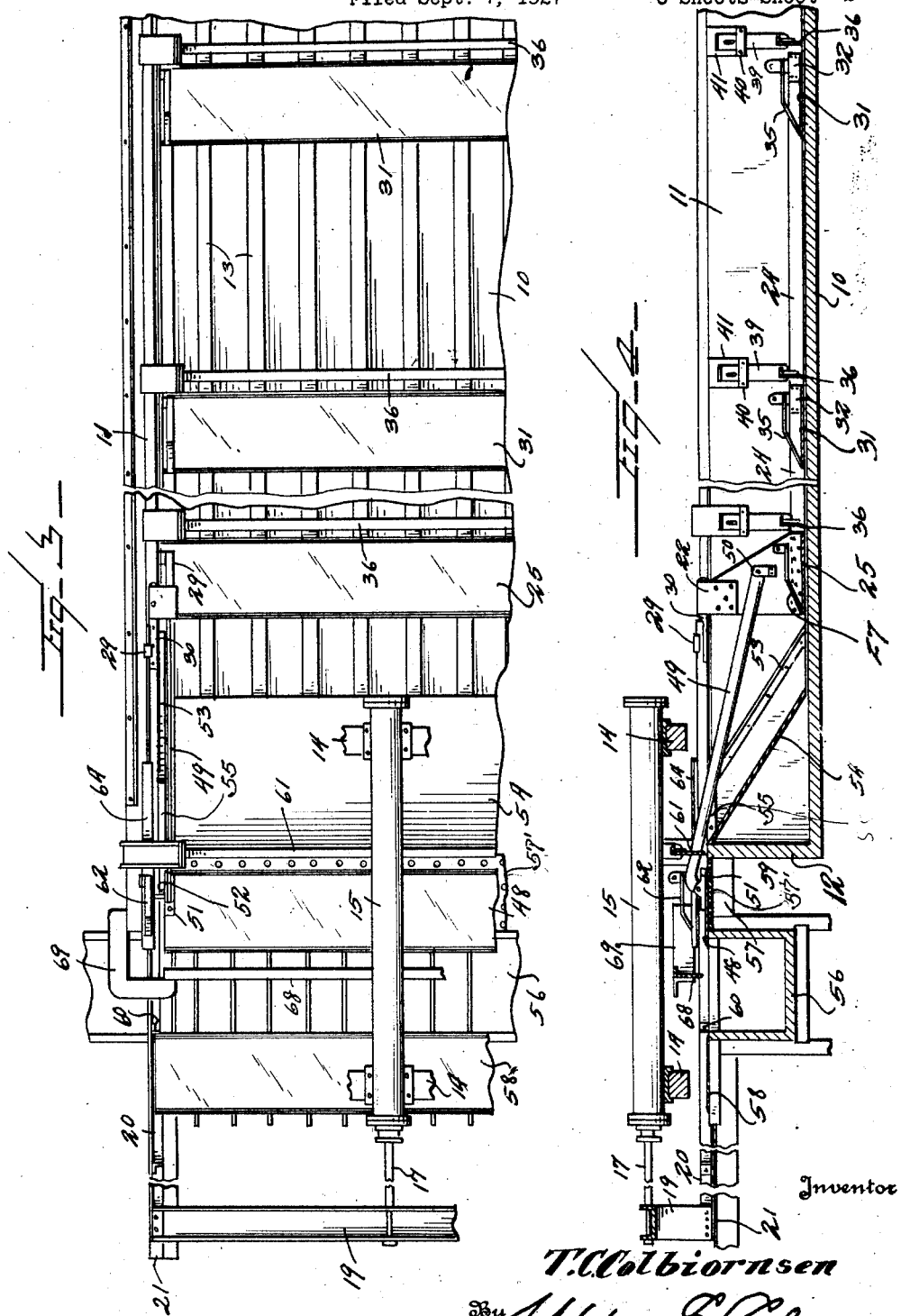

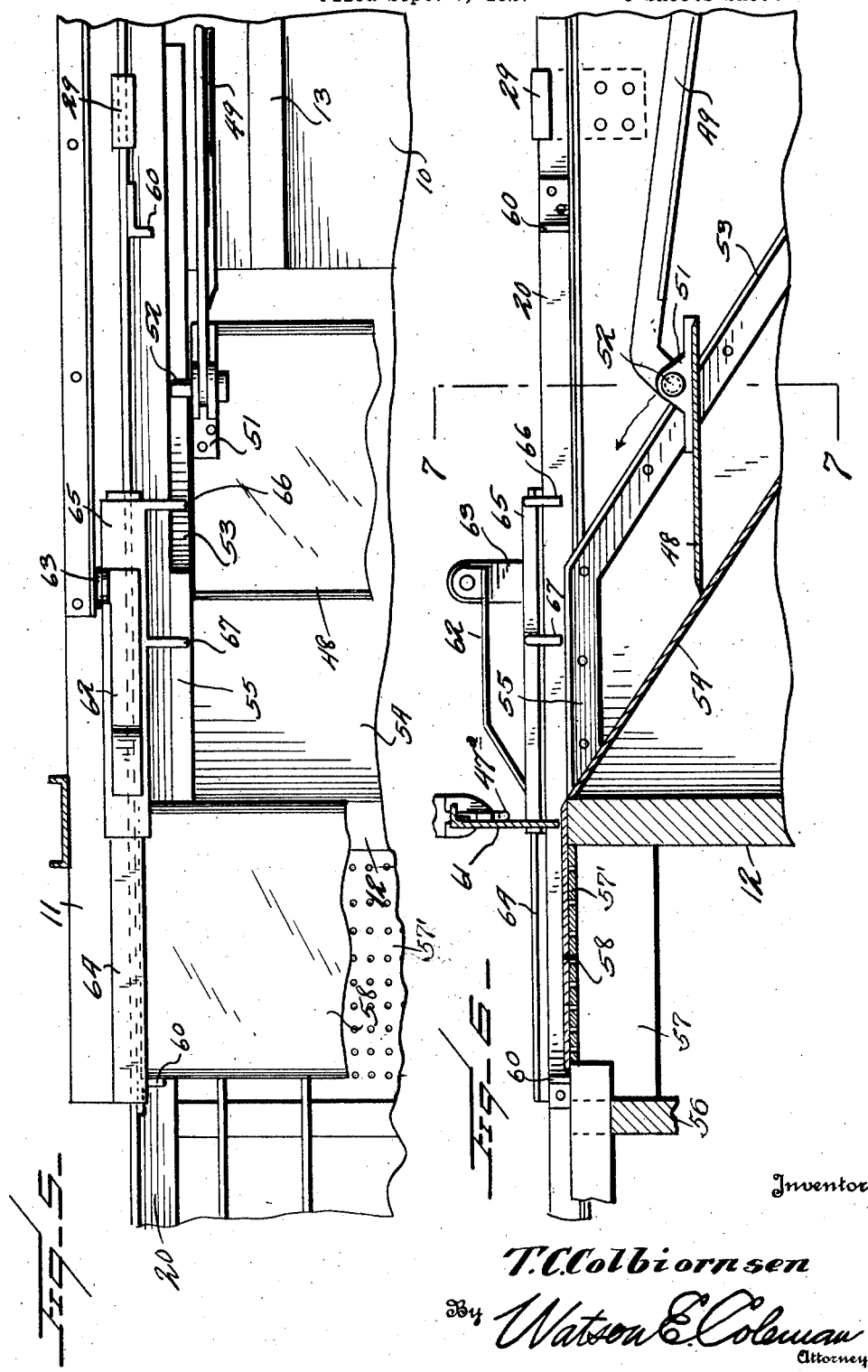

May 14, 1929.  T. C. COLBIORNSEN  1,712,651
LIFTER FOR SALT GRAINERS
Filed Sept. 7, 1927      6 Sheets-Sheet 4
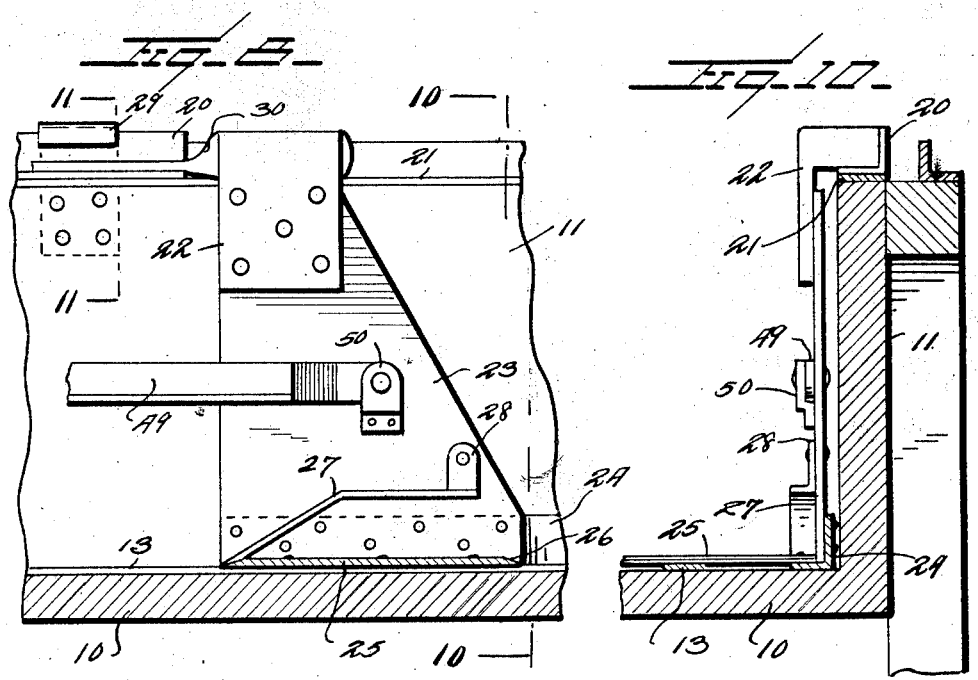
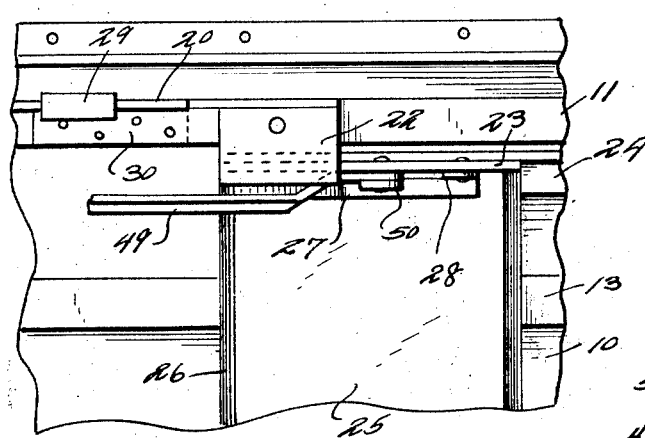
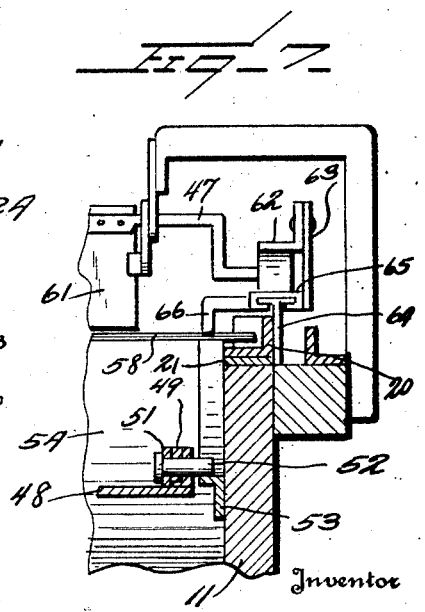
Inventor
T. C. Colbiornsen
By Watson E. Coleman
Attorney

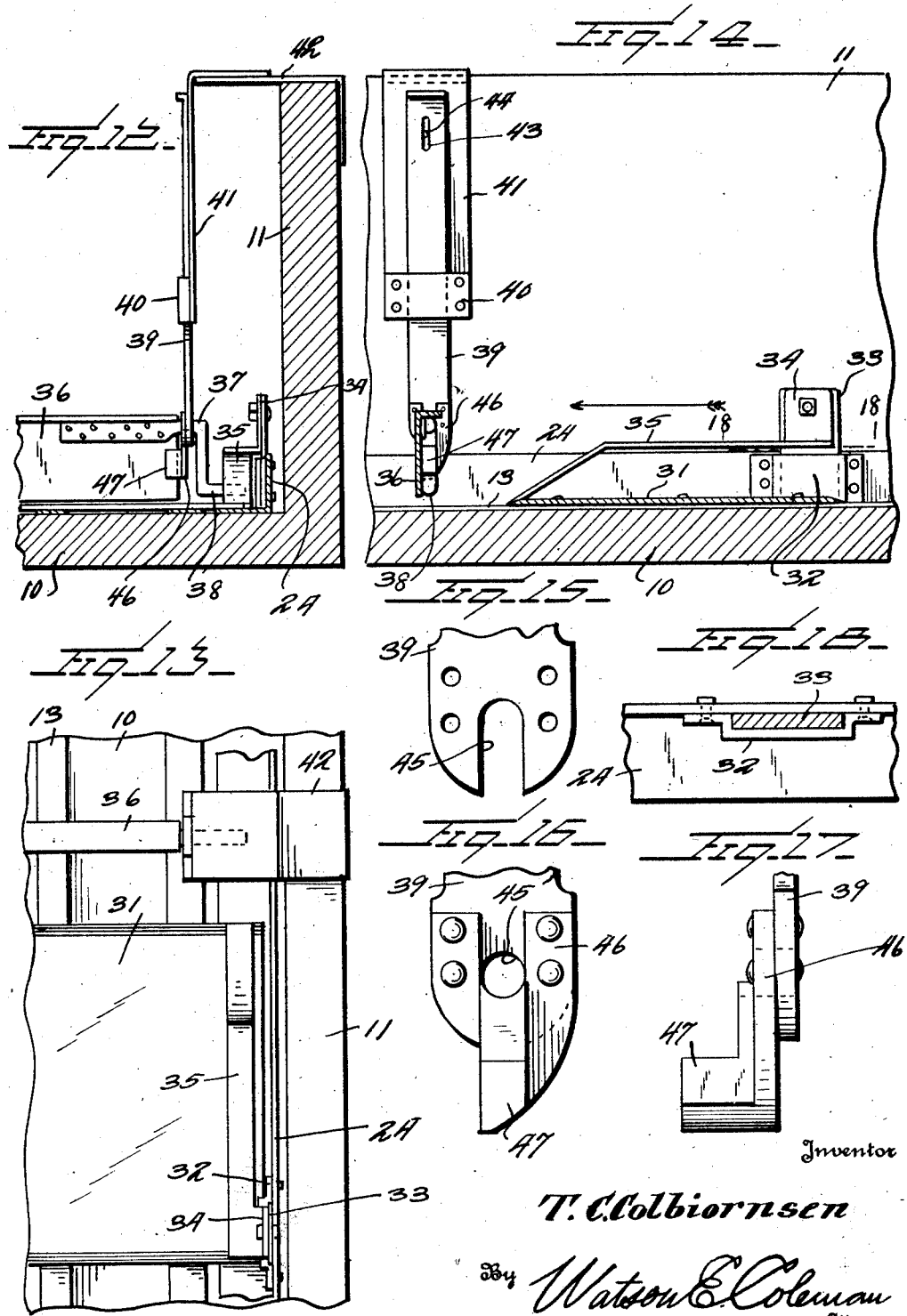

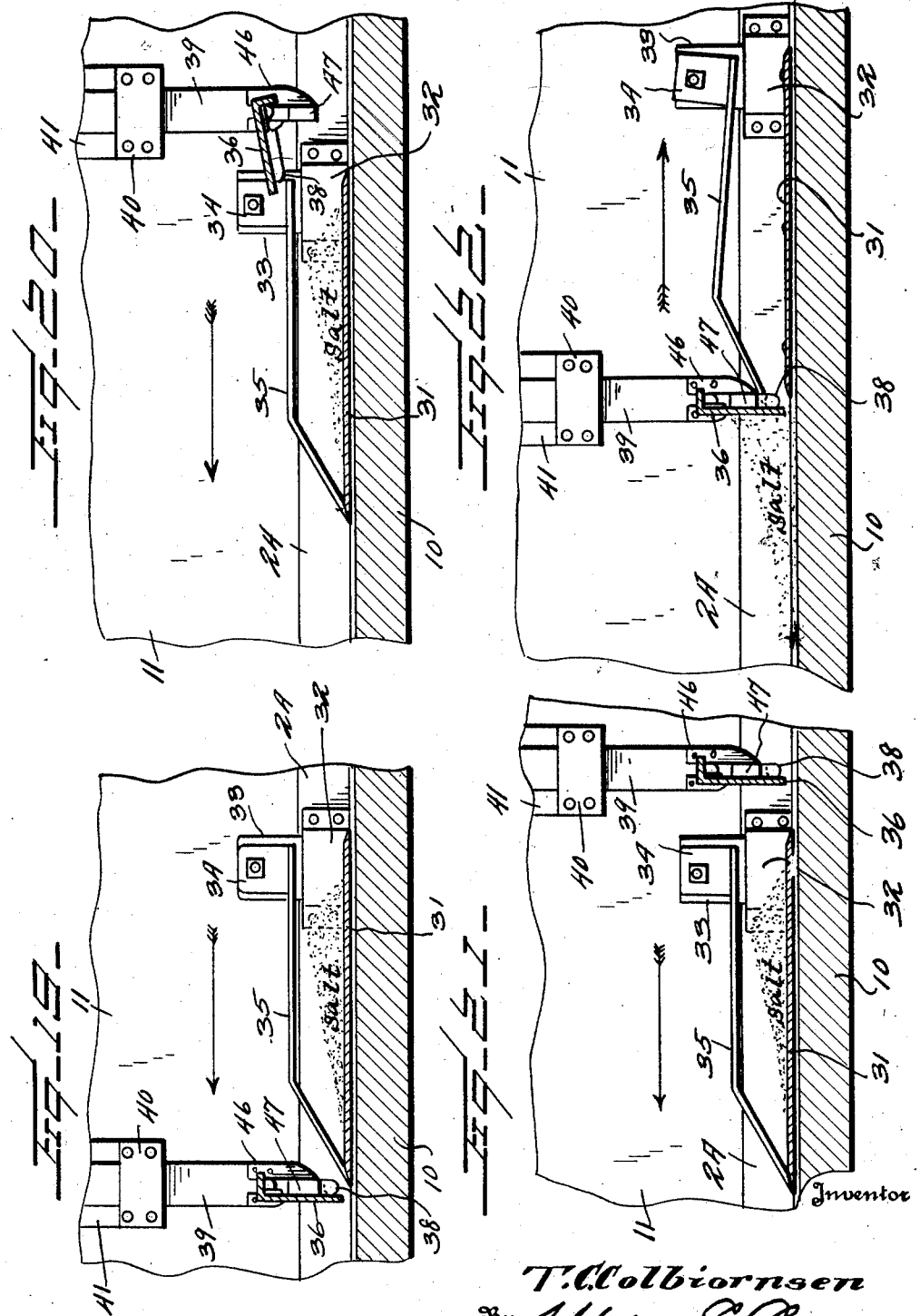

Patented May 14, 1929.

1,712,651

UNITED STATES PATENT OFFICE.

THORVALD C. COLBIORNSEN, OF ANTONITO, COLORADO.

LIFTER FOR SALT GRAINERS.

Application filed September 7, 1927. Serial No. 218,070.

This invention relates to devices for transferring salt from a grainer to a storage bin or receptacle, and particularly to those devices in which the transfer is made by reciprocating rakes or like elements.

The general object of the present invention is to improve upon devices of this character by the provision of means whereby the salt is transferred from the grainer to the storage bin or other receptacle without in any way injuring but, on the other hand, preserving the natural grain of the salt, and in this connection to provide mechanism for this purpose which will give the salt ample time for draining the brine back to the grainer.

A further object is to provide a mechanism of this character which differs materially from the rake systems ordinarily used, in that the salt is shoveled instead of dragged out of the grainer.

A still further object is to provide means whereby the salt is shifted by a series of reciprocating shovels step by step over the floor of the grainer until it is eventually carried upward to the grainer and then over to the transfer carrier.

Another object is to provide a mechanism of this character in which there are a series of shovels and a series of fixed rakes, as they may be called, which, as the shovels are retracted, will remove the salt therefrom and in which the first shovel of the series is caused to travel upward on an inclined way to the transfer plate whereby the salt is transferred to the transfer carrier.

Other objects have to do with the details of construction and arrangement of parts as will appear more fully hereinafter.

My invention is illustrated in the accompanying drawings, wherein:—

Figure 1 is a fragmentary top plan view of a grainer pan or like receptacle with my salt lifting mechanism applied thereto;

Figure 2 is a longtiudinal fragmentary sectional view on the line 2—2 of Figure 1, with certain of the shovels retracted;

Figure 3 is a top plan view similar to Figure 1 but showing the shovels in their forwardmost position;

Figure 4 is a longitudinal sectional view on the same line as Figure 2 but showing the shovels projected;

Figure 5 is a fragmentary top plan view of one wall of the grainer with mechanism applied thereon and showing the first shovel of the series moving up the incline;

Figure 6 is a sectional view of the construction shown in Figure 5;

Figure 7 is a section on the line 7—7 of Figure 6;

Figure 8 is a fragmentary side elevation of one wall of the grainer, the bottom being in section, showing the shovel in section and showing in elevation the support for the shovel;

Figure 9 is a top plan view of the structure shown in Figure 8;

Figure 10 is a section on the line 10—10 of Figure 8;

Figure 11 is a section on the line 11—11 of Figure 8;

Figure 12 is a sectional view on the line 12—12 of Figure 14 showing the rake;

Figure 13 is a top plan view of the structure shown in Figure 12;

Figure 14 is a longitudinal section through the rake and one of the shovels and through the grainer pan;

Figure 15 is a fragmentary face view of the lower end of the bracket for supporting the rake:

Figure 16 is a like view to Figure 15 but showing the angular stop member attached thereto;

Figure 17 is a side elevation of the structure shown in Figure 16;

Figure 18 is a fragmentary section on the line 18—18 of Figure 14;

Figure 19 is a longitudinal fragmentary sectional view showing a shovel operating the rake;

Figure 20 is a like view to Figure 19 but showing the shovel in position just about to entirely pass the rake, with the rake lifted;

Figure 21 is a like view to Figure 20 but showing the shovel moved past the rake;

Figure 22 is a like view to Figure 21 but showing the shovel retracted and the rake again dropped to its initial position;

Referring to these drawings, and particularly to Figure 1, 10 designates the grainer pan having the side walls 11 and the end walls 12. This grainer pan may be of any suitable length and width and may be made of any suitable material. Extending longitudinally along the bottom of the grainer pan are preferably disposed the rails or strips 13 which, however, do not form the subject-matter of this present application.

Disposed above one end of the grainer pan and supported as, for instance, upon the beams 14 is a cylinder 15, operating within which is a piston 16 having a piston rod 17. The ends of the cylinder are provided with suitable valves of any desired character whereby steam or other motive fluid may be admitted to the cylinder on one side or the other of the piston to thereby reciprocate the piston within the cylinder, suitable means being provided, of course, to permit the exhaust of the motive fluid after the piston has moved to one extreme of its travel and started back again. Inasmuch as means for this purpose are well known, no particular means has been illustrated, except that the cylinder is shown as provided with the two ports 18 whereby steam or compressed air may enter or be discharged. The extremity of this piston 17 is connected to a cross beam 19 which at its ends is connected to longitudinally extending angle irons 20, these angle irons operating upon the metal tracks 21 which are disposed upon the top of the side walls of the grainer pan, as shown in Figure 10.

Engaged with this operating angle iron 20 is the angular hanger 22, and riveted to opposite hangers are the shovel-supporting, vertically disposed plates 23 which are approximately triangular in form. Reinforcing the lower edges of the supporting plates 23 of the hangers are the angle irons 24 which rest upon the bottom of the grainer pan, as shown in Figure 10, and supported upon the horizontal flanges of these angle irons is the shovel 25 which consists of a relatively wide plate having beveled forward and rear edges 26. This plate either rests upon the bottom of the grainer pan or rests upon the upper surfaces of the longitudinally extending strips or rails 13. As this shovel moves forward, it acts to pick up or shovel up the salt which is disposed upon the bottom of the grainer pan and lift this salt onto the shovel.

Mounted upon the hangers 23 are the cam ribs 27, which at their rear ends have the upwardly extending lugs 28 which are riveted or otherwise attached to the hanger 23. Each cam rib extends forward and then downward at an inclination and intersects the shovel at the bottom thereof.

In order to hold the angle iron 20 down upon the track, there is provided a clip 29 which is bolted to the side wall of the grainer, as shown in Figure 11, and extends upward and then downward over the upwardly projecting flange of the angle iron so as to hold the angle iron in place. The angle iron 20 is connected to the member 23 by means of the short connecting rod 30 which may be riveted to the angle iron, as shown in Figure 9, and is attached in any suitable manner to the angular hanger 22, as shown in Figures 8, 9 and 10.

The preceding description applies more particularly to the forwardmost shovel 25. The rear shovels are constructed in approximately the same way as the forward shovel but are connected to the forward shovel so as to move therewith, as shown most clearly in Figures 4 and 19 to 22. Attached to the forward shovel and extending rearward therefrom are the angle irons 24 previously referred to, which rest upon the bottom of the grainer pan. These rest upon and move over the grainer pan and extend rearward and constitute not only reinforcing angle irons but also the connecting rods whereby the rear shovels are operated with or pulled and pushed by the forward shovel. These angle irons 24 extend rearward and are connected at intervals to any required number of rear shovels. All of the shovels rearward of the forward shovel 25 are alike and hence a description of one will apply to the others. Each shovel consists of a flat plate 31 exactly like the plate 25 and beveled at the forward and rear ends. Each plate is engaged with the angle irons 24 and riveted to each angle iron at the rear end of each of the plates 31 which constitute the shovels is a clip 32 (see Figure 18). Inserted in this clip and projecting upward above the upper edge of the corresponding angle iron 24 is a supporting plate or bracket 33 to which the ears 34 on the cam 35 are pivoted. There are two of these cams 35 of exactly the same construction as the cams 27 and these cams extend forward and then downward and intersect the shovel 31 at the forward edge thereof. These cams are for the purpose of lifting the rakes or scrapers as the shovels move forward.

Disposed in advance of each of the shovels is a scraper or rake which is hingedly mounted so as to permit the shovel to move forward beyond the rake, and then as the shovel moves backward the rake or scraper will scrape the salt from the shovel, as shown in Figures 19 to 22. Each scraper or rake is designated 36 and by reference to Figures 12 and 13 and also Figure 14 it will be seen that each rake is provided with a laterally projecting pivot pin 37 which is extended downward parallel to the plane of the rake or scraper and then extended laterally, as at 38, into the path of the corresponding cam 35. Each shaft or trunnion 37 is supported on a vertically adjustable supporting hanger 39 which extends up through a U-shaped clip 40 mounted upon a hanger plate 41, which in turn extends over and rests upon and is attached to an angular supporting plate or bracket 42. The hanger 39 at its upper end is vertically slotted, as at 43, and a guide pin 44 extends from the plate 41 through this slot.

The lower end of each hanger 39 is formed to provide a bearing for the trunnion or shaft 37, and to this end is vertically slotted at 45 (see Figure 15). After the trunnion has been put in place there is riveted to the lower end of this hanger a member 46 which is so formed as to close the lower end of the slot 45 and form a bearing opening, as shown in Figure 16, this member then extending downward and outward at 47 to constitute a stop limiting the rearward movement of the scraper and preventing the scraper from moving in one direction beyond a vertical plane.

It will be obvious now from Figures 14 and 19 to 22 that as the forward shovel moves forward the angle irons 24 which form connecting rods will pull the succeeding shovels 31 and that the salt will be scraped up onto these shovels. As each shovel moves forward toward the scraper 36 in advance of the shovel, the cams 35 engaging the crank arms 38 will cause the oscillation of the corresponding scraper upward to an inclined position, as shown in Figure 20. As soon as the cam has passed, the scraper will drop to its vertical position and as the shovel is retracted, as shown in Figure 22, the scraper will scrape the salt from the shovel, the crank arms acting to lift up on the pivoted cams 35 to permit the shovel to pass rearward. Thus every time that the shovels move forward past a scraper, they will carry a certain amount of salt with them and each time that the shovels move rearward this salt will be deposited in front of the shovel and in front of the corresponding scraper. The stroke is such that a shovel in advance of a scraper will move rearward and pick up the salt that has been deposited in advance of the scraper and then carry this salt forward and deposit it in advance of a forward scraper so that the salt is moved step by step forward until it eventually is discharged in front of the lifting shovel 48. This shovel, as shown best in Figures 4, 5 and 6, is connected to the supporting plates 23 of the forwardmost shovel 25 by means of the pivoted links 49. These links are pivoted upon ears 50 on the substantially triangular plates 23 of the forwardmost shovel and the links extend forward, as shown in Figures 2 and 4, and are pivoted upon ears 51 mounted upon the lateral edges of the plate or shovel 48 at the rear margin thereof. These ears 51 are bifurcated to receive the end of the corresponding link. A pin 52 extends through these ears and through the end of the link and projects laterally, as shown in Figure 5, so as to engage an upwardly inclined track 53. This track is attached to the side wall of the grainer pan, as shown in Figure 7, and extends upward and forward to the top of the grainer pan and approximately parallel to an inclined plate 54 which extends upward from the bottom of the grainer pan to the upper edge of the end wall. This track 53 then extends forward, as at 55, the upper edge of this track being level with the upper edge of the end wall of the grainer.

Disposed in spaced relation to the forward wall of the grainer is a trough-shaped or chute-shaped element, shown in Figure 4 and designated 56, which I will designate the transfer carrier, which may have therein any suitable conveyor not shown whereby the salt may be conveyed away. Disposed upon guide beams 57 forming part of the frame supporting this transfer carrier is a shiftable plate (see Figure 2) designated 58 which normally is disposed over the space 59 upon the drainer 57' between the transfer carrier and the end wall of the grainer but which is shiftable, as will be seen by a comparison of Figures 2 and 4, from the position shown in Figure 2 to the position shown in Figure 4 when and as the lifter shovel 48 rides up onto the top of the grainer pan. Details of the connection between these parts are shown best in Figures 5, 6 and 7. This plate 58 is operated by the angle iron 20, which angle iron is constantly reciprocated by means of the reciprocating piston 16, as before stated, and this angle iron 20 is provided with the outwardly projecting lug 60 which is adapted to engage with the plate 58 and shift this plate forward from the position shown in Figure 2 to the position shown in Figure 4 as the angle irons 20 move forward.

Mounted just above the forward end of the upwardly inclined plate 54 is a scraper 61 (see Figure 6) which is mounted in the same manner as the other scrapers for swinging movement forward and held from rearward movement beyond a vertical plane by means of the stop 47ª. For the purpose of raising this scraper to permit the passage of the shovel 48, I provide the cams 62 (see Figure 6) which are mounted upon the upright members 63, these upright members being in turn mounted to slide upon a T-iron 64 (see Figure 7). The member 63 is mounted upon a slide 65 which embraces the upper flange of the T-iron and this guide is provided with the inwardly and downwardly projecting fingers or tappets 66 and 67. These tappets are adapted to be engaged by the projecting ends of the pivot pins 52, as shown most clearly in Figure 5. Thus as the lifter shovel 48 moves forward and upward in Figure 6, the pins 52 will strike tappet 67 and as the shovel moves up to the top of the pan and moves forward, the pins 52 strike the tappet 67, shifting the cams 62 forward and these, in the manner previously described, will act to lift the scraper 61 to permit the passage of the shovel to the position shown in Figure 4, the scraper 61 being slotted or otherwise formed to permit the passage of the connecting rod 49. As the lifter shovel 48 moves forward past the scraper 61, the plate 58 will, of course, move forward until it eventually occupies the position shown in Figure 4 and has moved not only from its position over the space 59 but has moved on beyond the transfer carrier 56.

Immediately above the transfer carrier there is disposed a fixed scraper 68 mounted upon the angle bracket 69 (see Figure 1) which acts to scrape the salt from the plate 58 as the plate moves from the position shown in Figure 2 to the position shown in Figure 4. As the lifter shovel 48 moves rearward from the position shown in Figure 4 back to the position shown in Figure 2, the scraper 61 will scrape the salt from the lifter shovel onto the top of the draining table 57, this draining table being perforated or otherwise so constructed as to permit the water from the salt to drain off, leaving the salt relatively dry. The plate 58 moving rearward from the position shown in Figure 4 to that shown in Figure 2 is forced underneath this body of salt upon the drainer and supports it until the plate 58 again moves forward, when the salt is scraped off by the scraper 68. Upon the rearward movement of the lifting shovel 48, the pins 52 will strike the tappet 66 and move the cams 62 from the position shown in Figure 4 to the position shown in Figure 2 again, thus permitting the scraper 61 to close and scrape the salt off the plate.

The general operation of this mechanism will be obvious from what has gone before, but it may be briefly stated as follows: The salt is constantly deposited in the grainer and the train of shovels are constantly being reciprocated by means of the piston 16. As each shovel moves to the rear, the salt in advance of the next rearward rake is lifted onto the shovel and on the forward stroke any salt which has deposited between the shovel and the next forward scraper, is picked up. As each shovel reaches or passes through the rake in advance of the shovel the rake is automatically lifted and then dropped behind the shovel so that as the shovel is again retracted upon the backward stroke of the piston 16, the rake or scraper will push the salt off of the shovel, as shown in Figures 19 to 22. The salt is thus advanced step by step toward the front end of the grainer until it eventually is engaged and carried upward by the lifter shovel 48. It is then deposited upon the drainer table 57' and there the water drains off. Upon a retraction of the shovels, the plate or shovel 58 is drawn backward and the salt in advance of the rake 61 is lifted upon the shovel and then as this shovel moves forward again this salt is scraped off by the fixed scraper 68 and discharged into the transfer carrier which, as before stated, may be made of any desired form of conveying apparatus.

While I have illustrated a certain structure which has been found particularly effective in actual practice, obviously I do not wish to be limited to all the details of this construction as these might be modified in many ways without departing from the spirit of the invention as defined in the appended claims.

I claim:—

1. The combination with a pan, of means for removing material from the pan comprising a plurality of shovels open at their forward and rear ends and operating over the bottom of the pan, means for giving the shovels a reciprocating movement of a greater amplitude than the distance between the shovels, and a rake disposed in advance of each shovel and moving upward upon the advance of the shovel to permit the passage thereof past the rake and moving to an obstructing position when the shovel has passed the rake to thereby scrape off the contents of the shovel.

2. The combination with a pan, of means for removing material therefrom comprising a plurality of shovels, each shovel extending entirely across the pan and each shovel being flat from front to rear and having downwardly inclined front and rear edges, means for giving the shovels a reciprocating movement of a greater amplitude than the distance between the shovels, and a plurality of rakes, one for each shovel, disposed in advance of each shovel and moving upward upon the advance of the shovel past the rake and moving downward to an obstructing position after the shovel has passed to thereby scrape material from the shovel.

3. The combination with a pan and means for removing material therefrom comprising a plurality of shovels, each shovel being flat from front to rear and having front and rear inclined edges and each shovel extending transversely across the entire pan, means for giving the shovels a reciprocating movement of a greater amplitude than the distance between the shovels, a plurality of rakes disposed in advance of each shovel and mounted to swing upward, and means carried by each shovel for swinging the corresponding rake upward to permit the passage of the shovel past the rake, the rake swinging downward to a vertical position when the shovel has passed to thereby cause the scraping off of material from the shovel as the shovel moves backward past the rake.

4. In an apparatus of the character described, a shovel flat from front to rear, means for reciprocating the shovel, a pivotally supported, vertically adjustable scraper disposed in the path of travel of the shovel and having a length less than the distance from end to end of the shovel, crank arms mounted upon the ends of the scraper and projecting laterally therefrom, and cams mounted upon the shovel at the extremities thereof and adapted to engage said crank arms to lift the scraper as the shovel moves forward to thereby permit the passage of the shovel past the scraper, said cams disengaging from the crank arms when the shovel has passed the scraper to permit the scraper to swing downward to a scraping position to remove the material from the shovel as the shovel moves rearward.

5. In an apparatus of the character described, a shovel flat from front to rear, means for reciprocating the shovel, a pivotally supported, vertically adjustable scraper disposed in the path of travel of the shovel and having a length less than the distance from end to end of the shovel, crank arms mounted upon the ends of the scraper and projecting laterally therefrom, and cams mounted upon the shovel at the extremities thereof and adapted to engage said crank arms to lift the scraper as the shovel moves forward to thereby permit the passage of the shovel past the scraper, said cams disengaging from the crank arms when the shovel has passed the scraper to permit the scraper to swing downward to a scraping position to remove the material from the shovel as the shovel moves rearward, the cams being pivotally mounted upon the shovel so as to be lifted by said crank arms and shifted to inoperative position upon the rearward movement of the shovel.

6. In an apparatus of the character described, a shovel flat from its forward edge to its rear edge, upright members mounted upon the rear of the shovel at its ends, forwardly and downwardly extending cam plates pivotally mounted upon said uprights and at their forward ends resting upon the forward edge of the shovel, means for reciprocating the shovel, means for scraping material from the shovel as the shovel moves backward after a forward stroke including a pivotally supported scraper less in length than the shovel and having crank arms at its extremities adapted to be engaged by the upper faces of the cams as the shovel moves forward to thereby cause the lifting of the scraper to permit forward passage of the shovel, said scraper swinging downward to a vertical position in engagement with the shovel after the shovel has passed the scraper, said crank arms upon a rearward movement of the shovel acting to lift the cams to an inoperative position to permit the rearward movement of the shovel without affecting the scraper.

7. The combination with a pan, of means for removing material from the pan comprising a plurality of shovels extending across the pan from end to end thereof, said shovels being transversely flat and operating over the bottom of the pan, means for giving the shovels a reciprocating movement, a plurality of scrapers disposed one in advance of each shovel, means for causing the upward movement of the scrapers as each shovel reaches the same and passes the scraper, the scrapers moving to a scraping position after passage of the corresponding shovel to thereby scrape material from the shovel upon the rearward movement of the shovel, an inclined member at the forward end of the pan, one of said shovels operating over the forward end of the pan and said inclined member to thereby lift the material over the end wall of the pan.

8. The combination with a pan, of means for removing material from the pan comprising a plurality of shovels extending across the pan from end to end thereof, said shovels being transversely flat and operating over the bottom of the pan, means for giving the shovels a reciprocating movement, a plurality of scrapers disposed one in advance of each shovel, means for causing the upward movement of the scrapers as each shovel reaches the same and passes the scraper, the scrapers moving to a scraping position after passage of the corresponding shovel to thereby scrape material from the shovel upon the rearward movement of the shovel, an inclined member at the forward end of the pan, one of said shovels operating over the forward end of the pan and said inclined member to thereby lift the material over the end wall of the pan, and means for causing the last named shovel to be disposed in a substantially horizontal plane as it moves up said incline.

9. The combination with a pan, of means for removing material from the pan comprising a plurality of shovels extending across the pan from end to end thereof, said shovels being transversely flat and operating over the bottom of the pan, means for giving the shovels a reciprocating movement, a plurality of scrapers disposed one in advance of each shovel, means for causing the upward movement of the scrapers as each shovel reaches the same and passes the scraper, the scrapers moving to a scraping position after passage of the corresponding shovel to thereby scrape material from the shovel upon the rearward movement of the shovel, an inclined member at the forward end of the pan, one of said shovels operating over the forward end of the pan and said inclined member to thereby lift the material over the end wall of the pan, and means for causing the last named shovel to be disposed in a substantially horizontal plane as it moves up said incline, a draining table upon which the material is deposited by said last named shovel, and means for discharging material from the draining table.

10. The combination with a pan, of a plurality of scrapers mounted upon the pan for swinging movement forward and upward, each scraper having a stop holding the scraper from further movement when the scraper swings downward and rearward to a vertical position, means for removing material from the bottom of the pan comprising a plurality of connected shovels, each shovel being transversely flat and extending across the bottom of the pan, each shovel having a length greater than that of the scrapers, and means for giving the shovels a reciprocating movement of a greater amplitude than the distance between said scrapers and of a greater amplitude than the distance between said shovels.

11. The combination with a pan, of means for removing material from the bottom of the pan comprising a plurality of connected reciprocating elements, means for giving the elements a reciprocatory motion across the bottom of the pan, the amplitude of the reciprocation being greater than the distance between the elements, and means operating as each element reaches the forwardmost point of its travel and moves rearward acting to remove material from the element onto the floor of the pan to thus cause a step by step movement of the material from one end of the pan to the other, and means for lifting material deposited at the forward end of the pan over the adjacent end wall of the pan.

12. The combination with a salt graining pan, of means for removing salt therefrom comprising tracks on the side walls of the grainer pan, a shovel extending across the pan adjacent the forward end thereof, said shovel including upwardly extending side members having sliding engagement with the tracks, a plurality of shovels disposed at spaced distances behind the first named shovel, links connecting said shovels to each other and to the first named shovel for common movement, each of said shovels extending transversely across the width of the pan and being transversely flat from front to rear, pivoted cams mounted in conjunction with each shovel at the ends thereof, a plurality of hangers mounted upon the side walls of the pan, a plurality of scrapers, one for each hanger, swingably mounted upon the corresponding hangers for movement forward and upward to a horizontal position or downward to a vertical position, the hangers having stops preventing the rearward movement of the scrapers, said cams acting to lift the scrapers upon the approach of the corresponding shovel to thereby permit the shovel to pass the scraper, the backward movement of the shovels causing the scrapers to scrape the salt therefrom onto the bottom of the pan, the distance between said scrapers being equal to the distance between the shovels and the amplitude of reciprocation of the shovels being greater than the distance between the shovels, an inclined lifting member disposed at the forward end of the pan, a shovel operating over the forward end of the pan and said lifting member, links pivotally connected to the first named shovel and pivotally connected to said lifting shovel, means for causing the lifting shovel to retain a horizontal position as the lifting shovel moves up the inclined member, and a scraper pivotally supported above the forward end of the pan and adapted to swing upward and forward to permit the passage of the shovel upon a forward movement thereof but downward to a vertical position as the shovel moves rearward to scrape material therefrom.

13. The combination with a salt graining pan having tracks on the side walls thereof, of means for removing salt therefrom comprising a shovel extending across the pan adjacent the forward end thereof, said shovel including upwardly extending side members having sliding engagement with the tracks on the side walls of the pan, a plurality of shovels disposed at spaced distances behind the first named shovel, links connecting said shovels to each other and to the first named shovel for common movement, each of said shovels extending transversely across the width of the pan and being transversely flat from front to rear, pivoted cams mounted in conjunction with each shovel at the ends thereof, a plurality of hangers mounted upon the side walls of the pan, a plurality of scrapers, one for each hanger, swingably mounted upon the corresponding hangers for movement forward and upward to a horizontal position or downward to a vertical position, the hangers having stops preventing the rearward movement of the scrapers, said cams acting to lift the scrapers upon the approach of the corresponding shovel to thereby permit the shovel to pass the scraper, the backward movement of the shovels causing the scrapers to scrape the salt therefrom onto the bottom of the pan, the distance between said scrapers and the amplitude of reciprocation of the shovels being less than the distance between the shovels, an inclined lifting member disposed at the forward end of the pan, a shovel operating over the forward end of the pan and said lifting member, links pivotally connected to the first named shovel and pivotally connected to said lifting shovel, means for causing the lifting shovel to retain a horizontal position as the lifting shovel moves up the inclined member, a scraper pivotally supported above the forward end of the pan and adapted to swing upward and forward to permit the passage of the shovel upon a forward movement thereof but downward to a vertical position as the shovel moves rearward to scrape material therefrom, a draining table upon which the last named shovel moves and upon which the salt is deposited by said last named scraper, a transfer carrier disposed beyond the draining table, a transversely flat shovel movable over the transfer carrier and onto the draining table and connected to reciprocate with said lifting shovel, and a scraper disposed above the path of travel of the last named shovel and acting to scrape salt therefrom into said transfer carrier.

14. The combination with a salt grainer pan, of power operated means for shovelling the salt collecting in the bottom of the pan forward from the rear end of the pan to the forward end thereof and then lifting said salt over the top of the pan including a plurality of shovels reciprocating over the bottom of the pan, each shovel having a blade lying substantially flat against the bottom of the pan each shovel upon its forward movement collecting salt from the bottom of the pan and means for sweeping the salt so collected from the respective shovels as the shovels start upon their rearward movement.

15. In an apparatus of the character described, a pan, an inclined member at one end of the pan, means for lifting material from the bottom of the pan up said inclined member including a shovel extending entirely across the pan and flat from its forward end to its rear end, means for reciprocating said shovel up said inclined member and back again, means on the wall of the pan for holding the shovel in an approximately horizontal position as it moves up or down the inclined member, and means at the top of the inclined member for scraping the material from the shovel.

16. In an apparatus of the character described, a pan, an inclined member at the forward end of the pan, a flat receiving surface in advance of the forward wall of the pan at the top thereof, means for carrying material from the forward end of the pan up said incline and depositing it upon said surface comprising a transversely flat shovel having a width approximately equal to that of the pan, links to which said shovel is pivoted at its ends, the pivotal connection including laterally projecting pins, flanges carried upon the side walls of the pan and extending parallel to the inclined member and at their upper ends extending horizontally, with which flanges the laterally projecting pins are adapted to engage, a scraper mounted above the wall of the pan, and means for automatically shifting the scraper to an upwardly and forwardly extending position as the shovel approaches the scraper to permit the shovel to pass the scraper, the scraper then tilting to a vertical position to cause the removal of material from the shovel as the shovel moves rearward.

17. In an apparatus of the character described, a grainer pan, a draining table disposed immediately beyond one end wall of the grainer pan and a transfer carrier disposed beyond the drainer table, an inclined member leading upward from the bottom of the pan toward said end wall, a transversely flat shovel normally disposed upon the drainer table and extending transversely across the same, a transversely flat shovel normally disposed upon the bottom of the pan adjacent the forward end thereof, power operated means for simultaneously reciprocating the shovels including a link to which the second named shovel is pivoted, means for maintaining the second named shovel in a horizontal position as it passes up said incline, means for scraping material from the shovel onto said draining table as the shovel moves rearward, and means for scraping material from the first named shovel as the latter moves forward over the transfer carrier.

18. In an apparatus of the character described, a horizontal pan surface, a shovel reciprocating over said horizontal surface and flat from front to rear and open at its front and rear ends, a scraper pivotally supported above the pan from vertical oscillation in advance of the shovel, and normally hanging vertically with its lower edge positioned to contact with the upper surface of the shovel, means on the shovel to cause the scraper to swing upward to permit the passage of the shovel underneath the scraper, said means permitting the scraper to swing downward to a vertical position after the shovel has passed to thus scrape off material from the shovel upon the rearward movement of the shovel.

In testimony whereof I hereunto affix my signature.

THORVALD C. COLBIORNSEN.